Patented Feb. 9, 1932

1,844,018

UNITED STATES PATENT OFFICE

WILHELM SAILER, OF SCHWAAN, GERMANY, ASSIGNOR TO THE MEAD RESEARCH ENGINEERING COMPANY, OF DAYTON, OHIO

METHOD OF PREPARING TANNING SUBSTANCES

No Drawing. Application filed December 12, 1929, Serial No. 413,685, and in Great Britain April 18, 1929.

The present invention relates to a method of preparing tanning substances.

It is known that waste sulphite cellulose liquors are used in tanning, as well as derivatives and condensation products of the cresol-, phenol- and naphthalene sulphonic acids, and also polyphenols, quinones, hydrogen peroxide and a series of similar chemicals.

These methods, however, are only partially satisfactory. Thus, for example, tanning with sulphite cellulose lye (containing lignin substances) is accompanied by great drawbacks. Also, tanning with the foregoing substances (aromatic compounds, hydrogen peroxide, etc.), contrary to the use of natural tanning agents, has not yet become generally introduced.

It has now been found, however, that tanning substances of great importance can be prepared by causing sulphite cellulose lye (lignin sulphonic acid), phenols, cresols, their derivatives, or other similar suitable compounds of the aromatic series, as well as natural tanning substances or mixtures thereof, to interact with enzymes, which are generally regarded in the art as belonging to the desmolases (e. g. so called phenolases, peroxydases, dehydrases, etc.) as well as also with oxygen (e. g. in the form of hydrogen peroxide, perborate, other substances which split off oxygen, etc.).

It can be very easily determined whether such an enzyme is suitable for the present purpose by ascertaining whether, when it is brought into contact with oxygen and phenols or their derivatives (e. g. guaiacol, pyrogallol, resorcin p-phenylenediamine, etc.), dehydrogenation or oxidation products, or condensation products are produced (e. g. quinones or complex polymerization or condensation products).

The new products produced from sulphite cellulose lye, lignin compounds, natural tanning agents, etc., by means of such peroxydases and oxygen were not known hitherto.

If halogens are allowed to react with the new reaction products, a further series of completely new products is obtained, the properties of which differ completely from those hitherto known, more particularly with regard to their tanning action.

The present method also represents a substantial advance, as the tanning agents prepared by it produce quite definite tanning effects which were heretofore impossible. Thus, for example, a skin from which the hair has been removed may be tanned through in a few days, with or without the assistance of natural tanning agents. The latter diffuse rapidly and the skins are as effectively tanned as if they had been tanned for months in the tan pit.

This circumstance makes it possible to fully tan leather by natural tanning extracts, such as chestnut wood tanning material, which if used alone will not produce leather of sufficient strength.

Moreover, a partial, e. g. a preliminary tanning with the present tanning agent, makes it possible for chrome liquors to completely tan the leather and to produce a chromeleather fibre which approximates the fibre produced by the natural plant tanning agents. In this way the shrinking after drying which is otherwise characteristic of crome leather is prevented, and the leather is prevented from acquiring a rubber-like nature.

Examples 1. 20 litres of sulphite cellulose waste liquor, 400 g. of hydrogen peroxide (30%) are mixed with 500 g. of peroxydase solution and allowed to stand for several days.

6 kg. of this reaction product with 100 kg. of water may be used for tanning in usual manner.

Instead of hydrogen peroxide, corresponding quantities of chemical compounds which split off hydrogen peroxide or active oxygen, such as perborates may be employed.

2. 20 kg. of pine bark extract or thickened sulphite cellulose waste liquor (lignin sulphonic acid) are mixed with 100 g. of hydrogen peroxide (30%) and 100 g. of peroxydase solution. The reaction product is mixed during stirring with 400 g. of bromine.

6 kg. of this reaction product may be used with 100 kg. of water in a manner usual in tanneries for preliminary tanning of unhaired skins. The preliminarily tanned pelt is thereupon completely tanned in natural tanning liquors with or without addition of chromium.

I claim:—

1. The process of preparing tanning substances which comprises interacting a tanning substance and an oxidizing agent in the presence of an enzyme.

2. The process of preparing tanning substances which comprises interacting a tanning substance and an oxidizing agent in the presence of an enzyme, and halogenating the product.

3. The process of preparing tanning substances which comprises acting upon a tanning substance with an agent capable of splitting off active oxygen and an enzyme of the peroxydase type.

4. The process of preparing tanning substances which comprises acting upon a tanning substance with an agent capable of splitting off active oxygen and an enzyme of the peroxydase type and halogenating the product.

5. The process of preparing tanning substances which comprises acting upon a tanning substance including sulphite cellulose waste liquor with hydrogen peroxide and an enzyme of the peroxydase type.

6. The process of preparing tanning substances which comprises acting upon a tanning substance including sulphite cellulose waste liquor with hydrogen peroxide and an enzyme of the peroxydase type, and mixing the reaction product with bromine.

7. As a new product, a tanning substance obtained by the interaction of a tanning substance and an oxydizing agent in the presence of an enzyme.

8. As a new product, a tanning substance obtained by the interaction of a tanning substance and an oxidizing agent in the presence of an enzyme, the reaction product being halogenated.

9. As a new product for use as a tanning substance, the reaction product of waste liquor resulting from the treatment of vegetable fibrous material with a sulphite containing chemical, and an oxydizing agent in the presence of an enzyme.

10. As a new product for use as a tanning substance, the reaction product of natural tanning substance and an oxydizing agent in the presence of an enzyme.

11. As a new product for use as a tanning substance, the reaction product of a compound of the aromatic series and an oxydizing agent in the presence of an enzyme.

12. As a new product for use as a tanning substance, the halogenated reaction product of waste liquor resulting from the treatment of vegetable fibrous material with a sulphite containing chemical, by an oxydizing agent in the presence of an enzyme.

13. As a new product for use as a tanning substance, the halogenated reaction product of a natural tanning substance and an oxydizing agent in the presence of an enzyme.

14. As a new product for use as a tanning substance, the halogenated reaction product of a compound of the aromatic series and an oxydizing agent in the presence of an enzyme.

15. As a new product for use as a tanning substance, the reaction product of an organic tanning material and an oxygen bearing substance in the presence of an enzyme belonging to the desmolases.

16. As a new product for use as a tanning substance, the reaction product of waste liquor resulting from the treatment of vegetable fibrous material with a sulphite containing chemical, and an oxygen bearing substance in the presence of an enzyme of the peroxydase type.

17. As a new product for use as a tanning substance, the halogenated reaction product of waste liquor resulting from the treatment of vegetable fibrous material with a sulphite containing chemical, and an oxygen bearing substance in the presence of an enzyme of the peroxydase type.

18. As a new product for use as a tanning substance, the reaction product of waste liquor resulting fom the treatment of vegetable fibrous material with a sulphite containing chemical, and hydrogen peroxide in the presence of an enzyme of the peroxydase type.

19. As a new product for use as a tanning substance, the halogenated reaction product of waste liquor resulting from the treatment of vegetable fibrous material with a sulphite containing chemical, and hydrogen peroxide in the presence of an enzyme.

In testimony whereof I have hereunto set my hand.

WILHELM SAILER.